(12) United States Patent
Bittner et al.

(10) Patent No.: US 6,223,341 B1
(45) Date of Patent: Apr. 24, 2001

(54) COMPUTER-PROGRAM COMPILERS COMPRISING A PROGRAM AUGMENTATION CAPABILITY

(75) Inventors: Calvin John Bittner, Essex Junction, VT (US); Bertrand M. Grossman, New York, NY (US); Richard Dimick Jenks; Stephen Michael Watt, both of Yorktown Heights, NY (US); Richard Quimby Williams, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/071,115

(22) Filed: May 1, 1998

Related U.S. Application Data

(63) Continuation of application No. 08/634,515, filed on Apr. 18, 1996, which is a continuation of application No. 08/327,086, filed on Oct. 21, 1994.

(51) Int. Cl.[7] .................................................. G06F 9/45
(52) U.S. Cl. .......................................................... 717/9
(58) Field of Search ...................................... 717/9

(56) References Cited

U.S. PATENT DOCUMENTS

| 4,656,583 | 4/1987 | Auslander et al. | 717/9 |
|---|---|---|---|
| 4,722,071 | 1/1988 | Gates et al. | 717/9 |
| 4,802,091 | 1/1989 | Cocke et al. | 717/9 |
| 5,107,418 | 4/1992 | Cramer et al. | 395/709 |
| 5,127,104 | 6/1992 | Dennis | 709/305 |
| 5,136,686 | 8/1992 | Koza | 706/13 |
| 5,280,613 | 1/1994 | Chan et al. | 717/5 |
| 5,355,496 | 10/1994 | Fant et al. | 717/6 |
| 5,396,631 | 3/1995 | Hayashi | 717/7 |
| 5,428,805 | 6/1995 | Morgan | 708/141 |
| 5,524,082 | 6/1996 | Horstmann et al. | 364/489 |
| 5,537,620 | 7/1996 | Breternitz, Jr. | 395/709 |
| 5,966,537 | 10/1999 | Ravichandran | 395/709 |
| 5,999,739 | 12/1999 | Soni et al. | 395/709 |
| 6,026,241 | 2/2000 | Chow et al. | 395/709 |
| 6,029,005 | 2/2000 | Radigan | 395/709 |

OTHER PUBLICATIONS

Dean et al., Vortex: An Optimizing Compiler for Object–Oriented Languages, ACM, p. 83–100, 1996.*
Sirkin et al., Software Components in a Data Structure Precompiler, IEEE, p. 437–446, 1993.*
Skeppstedt et al. Simple Compiler Algorithms to Reduce Ownership Overhead, ACM, p. 286–296, 1994.*

* cited by examiner

Primary Examiner—Kakali Chaki
Assistant Examiner—John Q. Chavis
(74) Attorney, Agent, or Firm—Scully, Scott, Murphy & Presser; Stephen C. Kaufman, Esq.

(57) ABSTRACT

A method for optimizing and transforming a compiler program in a computer system. The method comprises the steps of constructing a compiler comprising a program augmentation capability; and, locating this capability in association with phases of a standard compilation process. The program augmentation capability may comprise symbolic automatic differentiation, or generation of Taylor series, or generation of Hessian or Jacobian matrices.

2 Claims, 5 Drawing Sheets

COMPUTER-PROGRAM COMPILERS COMPRISING A PROGRAM AUGMENTATION CAPABILITY

CROSS REFERENCE TO RELATED APPLICATION

The present application is a continuation of application Ser. No. 08/634,515 filed Apr. 18, 1996 which is a file wrapper continuation of U.S. Ser. No. 08/327,086 filed Oct. 21, 1994.

FIELD OF THE INVENTION

This invention relates to computer-program compilers comprising a program augmentation capability.

BACKGROUND OF THE INVENTION

Computer-program compilers comprise programs of hardware that can translate programs written in a source language into those written in a target language. For example, the source language may comprise a high level language such as Fortran, and the target language may also comprise a high level language e.g., a transformed Fortran, or alternatively, an assembly code or machine language.

SUMMARY OF THE INVENTION

Our work comprises combining and integrating two disparate concepts, as they relate to computer program compilers.

The first concept centers around compiler techniques comprising code optimization, which seek a transformation of the program with an aim of improving (optimizing) an efficiency or performance of a target program. For example, a goal of an optimizing compiler may be to generate a smaller or a faster set of object code that exactly duplicates a function of the program as it was written.

The second comprises directly providing a compiler with a program augmentation capability; e.g., an automatic symbolic differentiation capability (comprising a forward, reverse, or hybrid mode) which can augment the compiled program to include values for derivatives of the program's function. This second concept also comprises other augmentations to the compiled program e.g., consistency verification under dimensional analysis.

We combine these two concepts in the following way.

First, we recognize that an efficient employment of symbolic derivatives may be enhanced by identifying expressions that have equal values and eliminating redundant calculation along any path in the target program. Hence, no mathematical expression along any path in a target program is evaluated more than once. This is an optimization of the target program and it may be achieved for any operation, or sequence of operations, that are valid in the language of the source program. These include, but are not limited to, feedback loops, conditions branching and GO TO jumps in the control flow, subrouting calls, MAX, MIN or ABS (Absolute) evaluations, and table look-up data. We refer to this optimization as redundant expression elimination. Furthermore, we recognize that not all intermediate derivatives are needed. Therefore, the program augmentation capability preferably does not generate them in the first place. We refer to this optimization as an employment of global dependency information.

Secondly, we observe that extant compilers do not directly comprise a symbolic differentiation capability. Instead, this function can be done by and automatic symbolic differentiation preprocessing program.

Thirdly, we observe that extant automatic differentiation programs comprise a structure/sequence wherein automatic symbolic differentiation is done locally on a statement-by-statement basis. That is to say, the structure/sequencing of an extant automatic differentiation program is such that it can not avail itself of global dependency information or redundant expression elimination as it references automatic symbolic differentiation. Accordingly, for a vantage point of our invention, it is possible to obtain an optimal or highly efficient code using extant automatic differentiation program structures.

We have now discovered a novel compiler structure/sequencing apparatus that is predicated on our employment of global dependency information and redundant expression elimination (in contrast to prior art local schema), which enables one to comprehend automatic symbolic differentiation as being inherently enhanced by its incorporation in proximity to, or within, a compiler's code optimization, thereby generating highly efficient code.

In a first aspect, the present invention comprises a method for optimizing and transforming a program to be compiled in a computer system. The method comprises the steps of:

1) constructing a compiler comprising a program augmentation capability;
2) locating this capability in association with phases of a standard compilation process.

In a second aspect, the present invention comprises a compiler apparatus for compiling a program to be executed on a general purpose target computer system. The compiler apparatus comprises:

1) a front end (FE) for initially processing an input program;
2) a symbol-information data structure (SIDS) in communication with the front end for recording information about symbols in an input program;
3) an intermediate language generator (ILG) in communication with the front end and the symbol-information data structure for producing intermediate language instruction;
4) an optimizer (OPT) in communication with the symbol-information data structure and the intermediate language generator;
5) a means for locating a program augmentation capability in operative association with the optimizer;
6) a back end (BE) in communication with the optimizer and/or the intermediate language generator for translating a program into target code.

The present invention as defined can realize several significant advantages.

First of all, as alluded to above, the qualities and attributes of the highly efficient code presently generated, arise in part from the fact that in our employment of e.g., symbolic differentiation done in operative association with the compiler optimizer, we can immediately avoid redundant calculations in the target program. This situation, concomitantly, can advantageously reduce the time needed to perform a required calculation which, in turn, can save money and speed up developmental processes. Other advantages are enumerated below.

BRIEF DESCRIPTION OF THE DRAWING

The invention is illustrated in the accompanying drawing, in which.

DETAILED DESCRIPTION OF THE INVENTION

We now reference the present invention by first setting forth a conceptual backdrop and insights into various aspects of the prior art. This approach, when set in apposition to a following detailed description of the present invention, can highlight novel aspects of the present invention.

Figure 1:
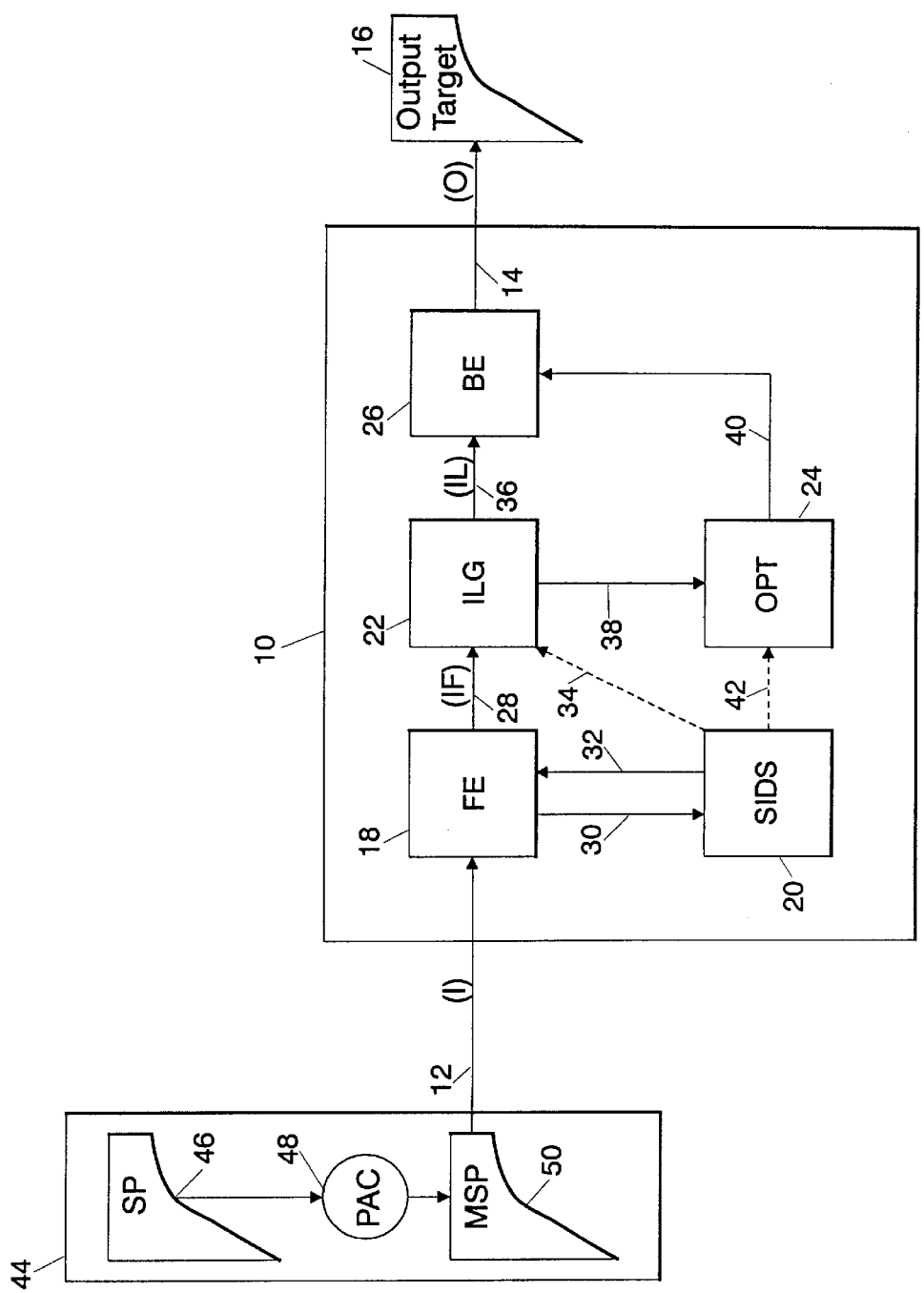
FIG. 1 shows a block diagram of a representative extant computer compiler.

Attention, accordingly, is now directed to FIG. 1 which shows a block diagram of a representative extant computer program compiler 10. In overview, the FIG. 1 compiler 10 accepts as an input (I) 12 a high-level language program, and operates on it to an end of generating an output (O) 14 comprising an output target language program 16. In particular, the compiler 10 comprises a front end (FE) 18, a symbol-information data structure(s) (SIDS) 20 for recording information about symbols in an output program, an intermediate language generator (ILG) 22, an optimizer (OPT) 24, and a back end (BE) 26.

The FIG. 1 front end 18 typically converts the input program 12 to a (possibly) different internal form (IF) that may be conveyed (arrow 28) to the intermediate language generator 22. As part of the preparation of the internal form, the front end 18 may save information (arrow 30) in, and possibly retrieve information (arrow 32) from, the symbol-information data structure(s) 20. These symbol-information data structures, if they are used, may either be separate from or adjoined to the intermediate form.

Note that the intermediate language generator 22 produces intermediate language instructions (IL) from the internal form of the program, possibly consulting (arrow 34) the symbol-information data structure(s) 20. The intermediate language instructions are typically more similar to the output language (O) than to the input language (I). The intermediate language form of the program may be conveyed to the back end 26 either directly (arrow 36) of by way of the optimizer 24 (arrows 38 and 40). If the intermediate language (IL) form of the program is conveyed to the optimizer (OPT) 24, then the optimizer produces a functionally equivalent and preferably faster or smaller version of the program, typically again in the intermediate form. This version of the program may then be conveyed (arrow 40) to the back end 26. To this end, the optimizer 24 may be in communication (arrow 42) with the symbol-information data structure(s) 20.

Once an intermediate language form of the program is received by the back end 26, either directly (arrow 36) or after optimization (arrow 40), the back end 26 converts the program to a functionally equivalent version expressed in the output language.

It is explicitly noted that the output program may be in the same language as I, IF, or IL, even though it is typically in a form distinct from all of these.

Note finally (but most importantly with respect to the present invention), that the FIG. 1 input (I) 12 comprising the high-level program for operation thereupon by the compiler 10, is itself a component of an input block 44. The input block 44, in turn, comprises a subject program structure (SP) 46 sequenced to a program augmentation capability (PAC) 48, in turn, sequenced to the modified subject program structure (MSP) 50.

In net assessment of the FIG. 1 prior art compiler 10, we observe that a program augmentation capability 48 is outside of, and independent of, the compiler operation. Our invention may be sharply contrasted with this structure/sequence, as the present invention comprises a unique integration of program augmentation as a compiler technique incorporated in the code optimization, or in direct proximity thereto.

Figure 2:
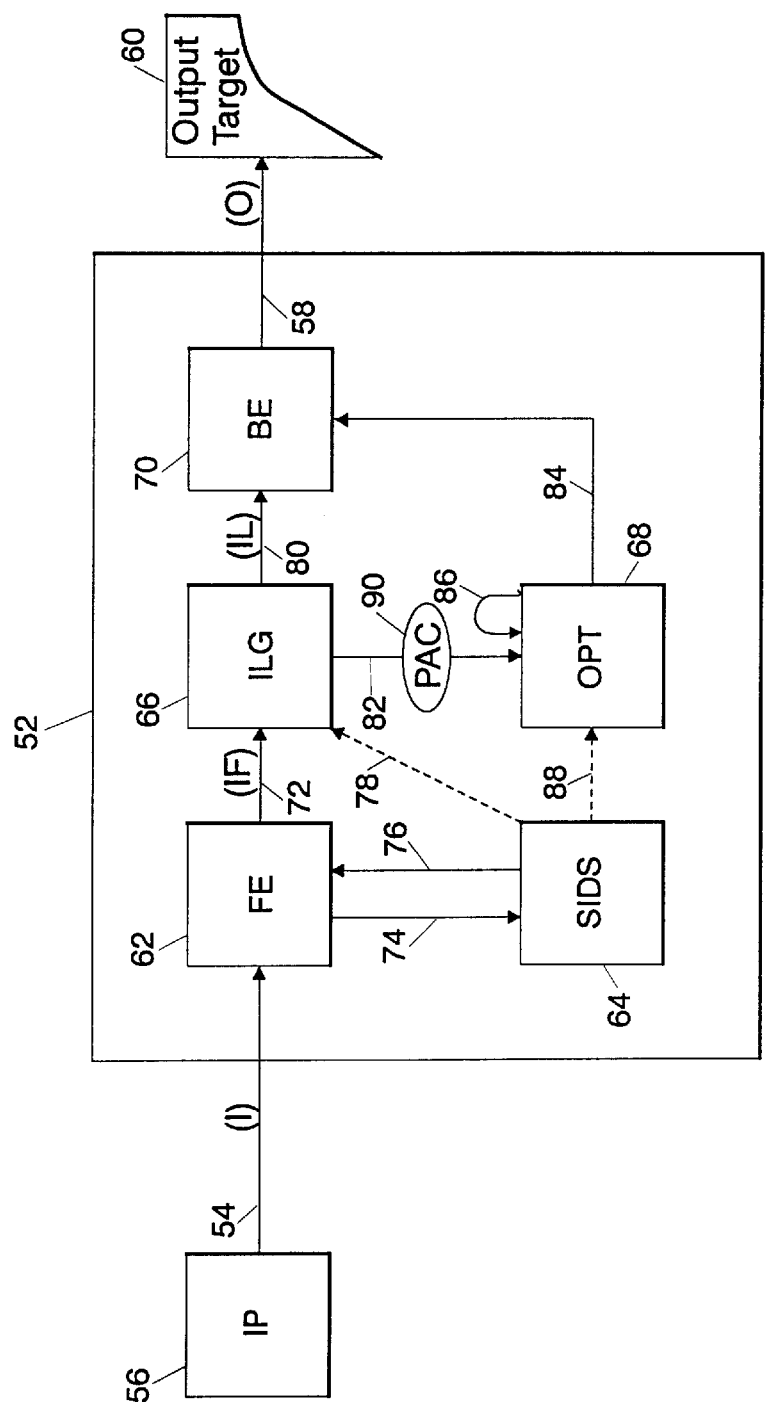
FIG. 2 shows a block diagram of a compiler apparatus of the present invention.

We now turn our attention to FIG. 2, which shows a block diagram of a preferred compiler apparatus 52 of the present invention.

An important advantage of the FIG. 2 compiler apparatus 52 is that it can optimally incorporate invariant conventional components of the FIG. 1 compiler, mutatis mutandis, thus securing great efficiencies of transformation and implementation, yet readily accommodating necessary changes reflective of the present invention. Accordingly, the following initial disclosure of the FIG. 2 structure and operation may be presented as a paraphrase to the FIG. 1 discussion, above.

In overview, the FIG. 2 compiler apparatus 52 can accept as an input (I) 54 a high-level language program (IP) 56, and can operate on it to an end of generating an output (O) 58 comprising an output target language program 60. In particular, the compiler apparatus 52 comprises a front end (FE) 62, a symbol-information data structure(s) (SIDS) 64 for recording information about symbols in an input program, an intermediate language generator (ILG) 66, an optimizer (OPT) 68, and a back end (BE) 70. These entities can all be realized by conventional components.

The FIG. 2 front end 62 preferably converts the input program 56 to a (possibly) different internal form (IF) 72 that may be conveyed to the intermediate language generator 66. As part of the preparation of the internal form, the front end 62 may save information (arrow 74) and possibly retrieve information (arrow 76) about the program and symbol information structure(s) 64. These symbol information structures, if they are used, may either be separate form, or adjoined to, the intermediate form.

Note that the intermediate language generator 66 can produce intermediate language instructions (IL) from the internal form of the program, possibly consulting the symbol information structure(s) (arrow 78).

The intermediate language instructions are typically more similar to the output language (O) 58 that the input language (I) 56. The intermediate language form of the program may be conveyed to the back end 70 either directly (arrow 80) or by way of the optimizer (arrows 82 and 84). If the intermediate language (IL) form of the program is conveyed to the optimizer 68, then the optimizer produces a functionally equivalent and preferably faster or smaller version of the program, typically again in the intermediate form. This version of the program may then be conveyed to the back end 70 or may be subject to some number of additional optimization passes (arrow 86). To this end, the optimizer 68 may be in communication (arrow 88) with the symbol-information data structure(s) 64.

Once an intermediate language form of the program is received by the back end 70, either directly (arrow 80) or after optimization (arrow 84), the back end 70 converts the program to a functionally equivalent version in the output language.

It is explicitly noted that the output program may be in the same language as I, IF, or IL, even though it is typically in a form that is distinct from all of these.

In sharp contrast to FIG. 1 however, the FIG. 2 compiler apparatus 52 comprises a critical and novel salient, namely an explicit inclusion of a program augmentation capability 90 located in association with phases of a standard compilation process, in particular, as a compiler technique incorporated in a code optimizer, or in direct (spatial, temporal) proximity thereto. This point is now elaborated.

First of all, it is noted that the program augmentation capability subsumes e.g., differentiation (including symbolic automatic differentiation), solution of ordinary differential equations by Taylor series in which the Taylor series can be automatically generated, or generation of Hessian matrices. In and of themselves, program augmentation capabilities are known conventional techniques. See, for example, L. B. Rall, *Automatic Differentiation: Techniques and Applications,* in Lecture Notes in Computer Science, Vol. 120, Springer-Verlog, Berlin, 1981.

As just alluded to, the program augmentation capabilities of the present invention is located (temporarily, spatially) in association with phases of a standard compilation process. For example, and to articulate what we define as phases, the FIG. 2 embodiment locates this capability 90 subsequent to the intermediate language generator 66 and antecedent to the optimizer 68.

Figure 3:
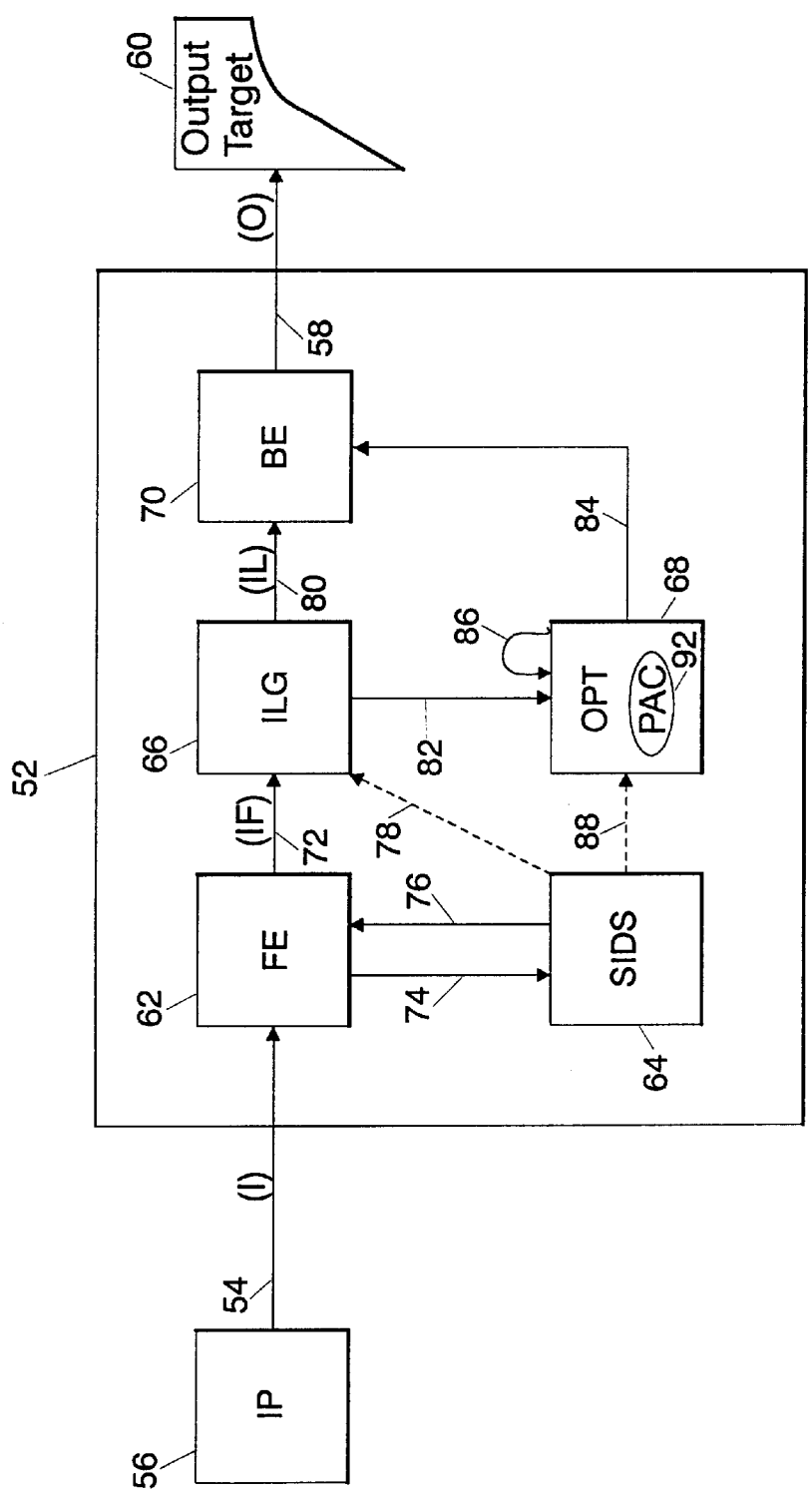
FIGS. 3, 4 and 5 show additional alternative embodiments of the FIG. 2 compiler apparatus.

FIG. 3 has a variation of this concept. Here, a program augmentation capability 92 is located intra the optimizer 68.

Figure 4:
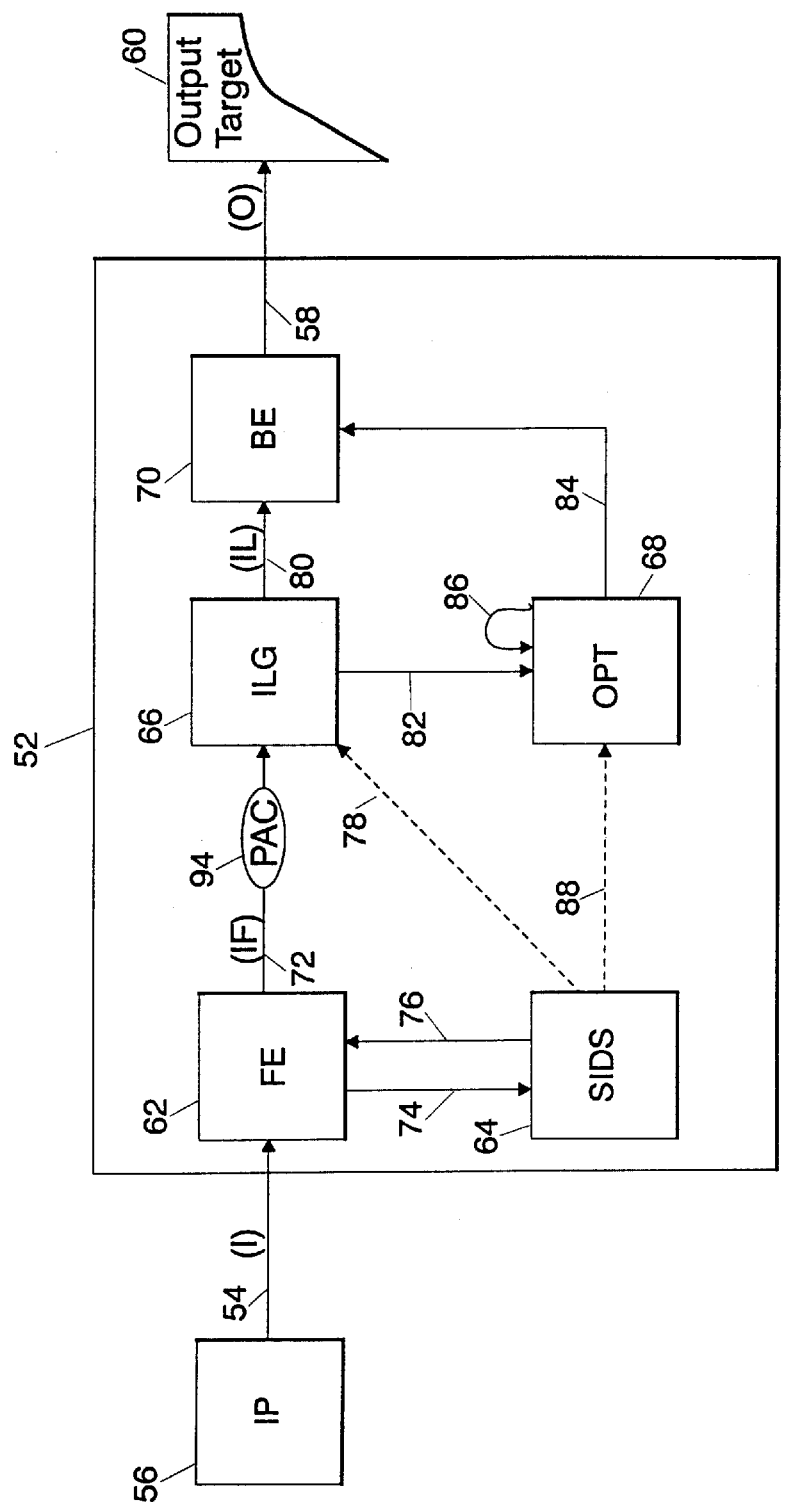

FIG. 4 shows a further variation: here, a program augmentation capability 94 is located subsequent to the front end 62, (which preferably collects symbol information (arrow 76)), and antecedent to the intermediate language generator 66.

Figure 5:
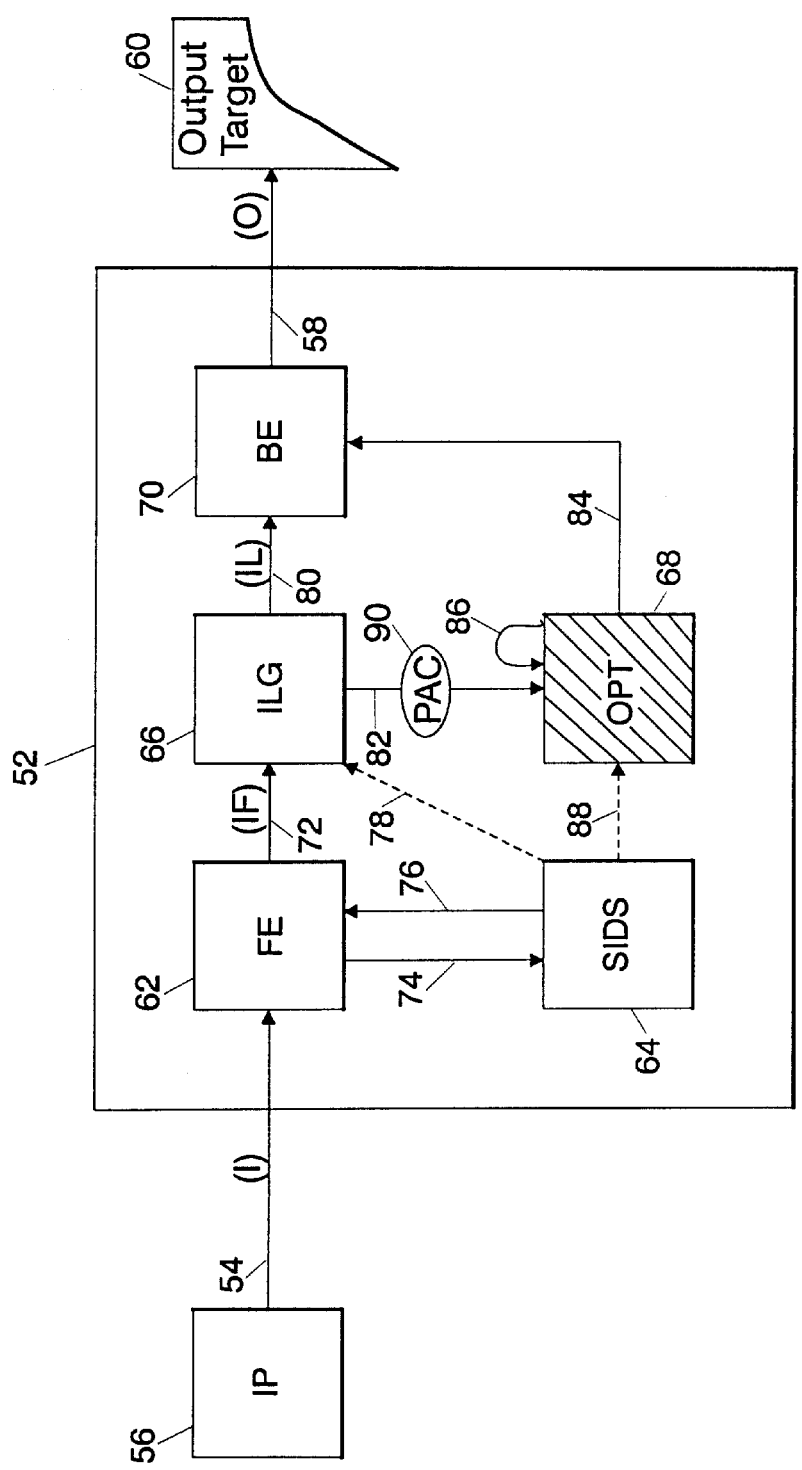

An important advantage of the present invention may now be readily discerned. FIG. 5 repeats the specifics of the FIG. 2 embodiment, but further comprises additional, enhanced optimization (indicated by a thatched-box optimizer 68') in which enhanced optimization may be specifically dedicated to directly handling the output of the program augmentation capability 90. For example, the optimizer 68' may be extended for handling differential dependencies when the program augmentation capability comprises symbolic automatic differentiation.

As an example of the present invention, input and target programs for a function Ids(Vgs,Vds,Vsx) appear in Appendices A and B, respectively. The target program in Appendix B was automatically generated from the input program in Appendix A by the compiler apparatus 52 described therein. Both the input and target programs were in Fortran; however, as stated above, the input and target programs could have been implemented in any computer language. Line numbers were added to Appendices A and B to identify input and results.

The automatically generated target program for Ids; i.e., the partial derivatives of Ids with respect to the independent variables Vgs, Vds and Vsx appearing in Appendix B, illustrates several features of the optimization described in this embodiment. These include a differential algebra compiler that can operate upon an input program that contains conditional branching (line 7 in Appendix A) and subroutine function calls (line 8 in Appendix A), and the absence of redundant calculation in the automatically generated target program by the substitution of common subexpression with new variables (e.g., variables t7t, t9t, t13t, t46t, t66t in Appendix B). Subroutines in the input program may comprise Fortran code or tabulated data. For tabulated data, derivatives are obtained by functions that numerically approximate the tabulated data. It is noteworthy that partial derivative terms that are always equal to 0 are automatically removed and factors that are equal to 1 are automatically removed.

Other embodiments of this invention include compilers designed to generate target programs for arrays of derivatives such as those found in Jacobian or Hessian matrices and power series expansions, as noted above.

| APPENDIX A |
| --- |
| 1   IMPLICIT REAL*8 (A–Z) |
| 2   phib = 0.3 |
| 3   theta = 0.1 |
| 4   eta = 0.1 |
| 5   mu = 500 |
| 6   cox = 1.0 |
| 7   IF (Vsx .LT. -phib) Vsx = -phib |
| 8   vtθ= TABUL3(VtTab,Vsx,Vds,Leff) |
| 9   vt = Vtθ+ be*(DSQRT(phib+VSX) - DSQRT(phib)) - de*DSQRT(Vds) |
| 10  Eeff = 0.5*Cox*(Vgs + Vtθ+ be*(DSQRT(phib+Vsx) - DSQRT(phib)) & -1.0+ DEXP(-Vds) )/Eps |
| 11  Mueff = Muθ/(1.0+ Theta*Eeff + Eta*Vds) |
| 12  Gamma = Cox*Mueff*(Weff/Leff) |
| 13  Ids = gamma*(Vgs - Vt - 0.5*Vds)*Vds |
| 14  STOP |
| 15  END |

| APPENDIX B |
| --- |
| 1   IMPLICIT REAL*8 (A–Z) |
|     REAL*8 Dtabul3(4) |
|     OgammaDvds = 0 |
|     OvtDvsx = 0 |
|     OvtθDvds = 0 |
|     OvtθDvds = 0 |
|     OeeffDvsx = 0 |
|     OldsDvgs = 0 |
|     OmueffDvsx = 0 |
|     OeeffDvds = 0 |
|     OgammaDvgs = 0 |
|     OmueffDvds = 0 |
|     OvsxDvsx = 0 |
|     OldsDvsx = 0 |
|     OvdsDvds = 0 |
|     OvtDvsx = 0 |
|     OeeffDvgs = 0 |
|     OldsDvds = 0 |
|     OgammaDvsx = 0 |
|     OmueffDvgs = 0 |
|     OvgsDvgs = 0 |
| 2   phib = 0.300 |
| 3   theta = 0.100 |
| 4   eta = 0.100 |
| 5   muθ = 500 |
| 6   cox = 1.00 |
|     IF (vsx .LT. -phib) THEN |
| 7 C> IF (Vsx .LT. -phib) Vsx = -phib) |
|     vsx = -0.300 |
|     OvsxDvsx = 0 |
|     END IF |
| 8 C> Vtθ = TABUL3(VtTab,Vsx,Vds,Leff) |
|     vtθ = Gtab3(vttab,vsx,vds,leff,Dtabul3) |
|     OvtθDvsx = Dtabul3(2)*OvsxDvsx |
|     OvtθDvds = Dtabul3(3)*OvdsDvds |
| 9 C> Vt = Vtθ+ be*(DSQRT(phib+Vsx) - DSQRT(phib)) - de*DSQRT(Vds) t7t = dsqrt(0.300+vsx) |
|     t9t = be*(-0.547722557505000+t7t) |
|     L10t = dsqrt(vds) |
|     vt = -de*t10t+t9t+vtθ |
|     t14t = be*DvsxDvsx |
|     t13t = 1/t7t |
|     OvtDvsx = 0.500*t14t*t13t+DvtθDvsx |
|     OvtDvds = -0.500*de*DvdsDvds/t10t+DvtθDvds |
| 10C> Eeff = 0.5*Cox*(Vgs + Vtθ+ be*(DSQRT(phib+Vsx) - DSQRT(phib)) |

-continued

APPENDIX B

```
C>      & -1.0+ DEXP(-Vds) )/Eps
        t23t = dexp(-vds)
        t25t = 1/eps
        eeff = 0.500*(-1.00+vgs+vt0+t9t+t23t)*t25t
        DeeffDvgs = 0.500*DvgsDvgs*t25t
        DeeffDvsx = 0.2500*t14t*t13t*t25t+0.500*Dvt0Dvsx*t25t
        DeeffDvds = 0.500*Dvt0Dvds*t25t-0.500*DvdsDvds*t23t*t25t
11C>    Mueff = Mu0/(1.0+ Theta*Eeff + Eta*Vds)
        t39t = 0.100*vds
        t40t = 0.100*eeff
        mueff = 500/(1.00+t40t+t39t)
        t46t = 1/(1.00+t39t+t40t)**2
        OmueffDvgs = 50.00*DeeffDvgs*t46t
        OmueffDvsx = 50.00*DeeffDvsx*t46t
        OmueffDvds = 50.00*DvdsDvds*t46t-50.00*DeeffDvds*t46t
12C>    Gamma = Cox*Mueff*(Weff/Leff)
        t56t = 1/leff
        gamma = mueff*weff*t56t
        OgammaDvgs = weff*OmueffDvgs*t56t
        DgammaDvsx = weff*OmueffDvsx*t56t
        DgammaDvds = weff*OmueffDvds*t56t
13C>    Ids = gamma*(Vgs - Vt - 0.5*Vds)*Vds
        t66t = 0.500*vds-vt+vgs
        ids = gamma*vds*t66t
        DidsDvgs = gamma*vds*DvtDvsx+vds*DgammaDvsx*t66t
        DidsDvsx = gamma*vds*DvtDvsx+vds*DgammaDvsx*t66t
        DidsDvds = gamma*vds*DvtDvds+(gamma*t66t-0.500*
        gamma*vds)*
        &DvdsDvds+vds*DgammaDvds*t66t
14      STOP
15      END
```

What is claimed:

1. A method for optimizing a source program having a logic structure that includes one or more executable paths containing mathematical expressions, said method comprising:

(a) integrating within a compiler a means for tracking global dependency information contained within one or more executable paths generated during a compiler process, a means for recognizing and eliminating redundant mathematical expressions found along any said one or more executable paths, and a means for augmenting one or more types of mathematical expressions;

(b) specifying one or more operations to be performed upon said one or more types of mathematical expressions contained within said first source program; and, (c) compiling said source program to automatically generate a target program containing augmented mathematical expressions including symbolic representations of said one or more specified operations to be performed upon said one or more types of mathematical expressions, said augmenting means utilizing said global dependency information and said redundant mathematical expression elimination along one or more paths of said target program to optimize generation of said augmented mathematical expressions within said target program.

2. The method according to claim 1, wherein said one or more operations are differentiation operations of mathematical functions.

* * * * *

UNITED STATES PATENT AND TRADEMARK OFFICE
CERTIFICATE OF CORRECTION

PATENT NO.     : 6,223,341 B1                                             Page 1 of 1
DATED          : April 24, 2001
INVENTOR(S)    : C. Bittner et al.

It is certified that error appears in the above-identified patent and that said Letters Patent is hereby corrected as shown below:

Column 1,
Line 18, "of" should read -- or --
Line 38, "The second comprises" should read -- The second concept comprises --
Line 51, "calculation" should read -- calculations --

Column 5,
Line 15, "capabilities" should read -- capability --

Column 6,
Line 13, "s" should read -- 5 --
Line 16, "vtθ" should read -- Vtθ --
Line 17, "VSX" should read -- Vsx --
Line 61, "L10t" should read -- t10t --

Column 7,
Lines 15 to 17, "50.00" should read -- -50.00 --
Line 24, "DvtDvsk+vds*DgammaDvsx*t66t" should read
-- DvgsDvgs+vds*DgammaDvgs*t66t --
Line 25, "gamma" should read -- -gamma --
Line 26, "gamma" should read -- -gamma --

Signed and Sealed this

Seventeenth Day of September, 2002

Attest:

JAMES E. ROGAN
Attesting Officer            Director of the United States Patent and Trademark Office